United States Patent
Amundson

(10) Patent No.: US 9,462,792 B2
(45) Date of Patent: Oct. 11, 2016

(54) BEEHIVE

(71) Applicant: Bruce Alan Amundson, Bellevue, WA (US)

(72) Inventor: Bruce Alan Amundson, Bellevue, WA (US)

(73) Assignee: Christopher Bruce Amundson, Bellevue, WA (US)

( * ) Notice: Subject to any disclaimer, the term of this patent is extended or adjusted under 35 U.S.C. 154(b) by 0 days.

(21) Appl. No.: 14/545,457

(22) Filed: May 6, 2015

(65) Prior Publication Data

US 2015/0320018 A1    Nov. 12, 2015

Related U.S. Application Data

(60) Provisional application No. 61/996,520, filed on May 9, 2014.

(51) Int. Cl.
*A01K 47/02* (2006.01)
*A01K 47/06* (2006.01)
*A01K 51/00* (2006.01)

(52) U.S. Cl.
CPC ............... *A01K 47/02* (2013.01); *A01K 47/06* (2013.01); *A01K 51/00* (2013.01)

(58) Field of Classification Search
CPC ...... A01K 47/00; A01K 47/02; A01K 47/04; A01K 47/06

USPC ........................................ 449/3, 6, 26, 35–40
See application file for complete search history.

(56) References Cited

U.S. PATENT DOCUMENTS

| | | | | |
|---|---|---|---|---|
| 34,034 A | * | 12/1861 | Corner | A01K 47/00 449/36 |
| 111,289 A | * | 1/1871 | Wilkinson | A01K 47/00 449/36 |
| 145,634 A | * | 12/1873 | Diehl | A01K 47/00 449/36 |
| 183,692 A | * | 10/1876 | Manchey | A01K 47/00 449/36 |
| 229,362 A | * | 6/1880 | Blaisdell | A01K 47/02 449/35 |
| 502,486 A | * | 8/1893 | Dewey | A01K 47/00 449/36 |
| 3,994,034 A | * | 11/1976 | Van Damme | A01K 47/06 449/12 |

* cited by examiner

Primary Examiner — Lisa Tsang
(74) Attorney, Agent, or Firm — Mark Zovko

(57) ABSTRACT

A beehive for honeybees having a configuration that allows a beekeeper to inspect the hive at regular intervals with minimal disturbance to the honeybees. The bees work comb frames contained within an array of master frames. The master frames are pivotably attached to a support pole with connectors fixed to the master frames. The connectors are arranged so that the array of master frames containing the comb frames are side by side and in a rectangular cross section when the beehive is closed. The master frames can be rotated around the support pole either individually or in groups allowing inspection of the comb frames without damaging the comb frames.

11 Claims, 8 Drawing Sheets

BEEHIVE

CROSS RELATION TO OTHER US APPLICATIONS

This application claims priority of Provisional Application No. 61/996,520 filed May 9, 2014.

BACKGROUND OF THE INVENTION

Currently, a typical beehive is comprised of a stack of boxes with internal hanging frames. This common beehive has a configuration similar to an office file cabinet with hanging files. The combs are arranged as the files in a file cabinet. The stacked boxes usually have between eight and ten comb frames in each box, and are stacked one on top of another. Each stacked box can weigh up to ninety pounds and contain as many as 25,000 bees. Handling or carrying the boxes can become a problem due to their weight and bulk. Further, the bees tend to glue both the individual boxes together, and the tops and bottoms of the comb frames within the boxes together with "bee glue" or propolis (which is a reddish substance collected by the bees from tree buds and used to stop up crevices in the hives) and with beeswax comb. Inspections are necessary of the beehive from at early as March through July on a weekly basis, requiring un-stacking the boxes and removing each comb frame for viewing. The inspection of this conventional beehive can damage or destroy the vertical highways that the bees have built and use for ingress and egress to the comb frames. The comb connecting the tops of the frame in the lower boxes to the bottoms of the frames in the box above can be disrupted or destroyed. Any comb destruction sets the progress of the beehive back as the bees will immediately begin to repair and refurbish the disrupted comb. The present disclosure presents a beehive which increases accessibility of the beehive to the beekeeper while also increasing efficiency in managing the bees. Disruption and destruction of combs during beehive inspection by the beekeeper is minimized.

SUMMARY OF THE INVENTION

The apparatus disclosed herein is a beehive for cultivating honeybees which has a spline pole aligned vertically. The spline pole can be set on a base or set into a spline pole holder which has been fixed into the ground by cement or the like. Master frames are provided which hold inner comb frames. The inner comb frames are areas in which the honeybees build wax comb and store nectar, pollen, brood, and honey. A master frame is pivotally connected to the spline pole using pivotable connectors having a straight portion and a circular portion. The straight portion of the connector is attached to the edge of the master frame by a suitable fastener. The circular portion of the connector has an aperture adapted to receive the spline pole. This connection described allows the master frame to rotate easily around the pole. Preferably, each master frame would use two pivotable connectors to connect with the spline pole. As multiple master frames are added to the beehive, the master frames align with each other similar in manner to the pages of a book. In other words, they are configured flat to each other and can be rotated either singularly or in groups around the pole without sliding over each other. The lack of strafing or sliding of one master frame over another as the master frames are rotated, prevents damage to the inner comb frames where the honeybees do their work. The inner comb frames we fit within the master frames by tabs resting on indentations or slots along the inside edges of each master frame. A beehive will typically start with inner comb frames on the lower end of the master frame and as the honeybees build out the comb, new inner comb frames can be added above the lower inner comb frames until the capacity of the master frame is reached. A further feature of this beehive herein disclosed includes a top cover over the top of the last inner comb frame to prevent the honeybees from building 'wild comb" in the void above the existing inner comb frames. An observation board is provided with the preferred embodiment of the disclosure. The observation board is slidably engaged in the master frame and allows visual inspection of any debris fallen from the inner comb frames. The observation board can be used in conjunction with an optional screened bottom board which fits beneath the bottom inner comb frame and above the observation board, allowing the honeybees quick access to the bottom row of inner comb frames, but permitting debris such as damaging mites to fall through the screen to the observation board.

The beehive of the present disclosure is also provided with doors, namely, a front and back door, which are pivotably attached to the spline pole in a manner similar to the master frames and are flat relative to the master frames when the beehive is in normal operation and not being inspected. The front door of the beehive has an entry slot where the bees will do most of their entering into and exiting from the beehive. The backdoor limits the entry and exit routes of the bees to the beehive. Preferably, a roof over the entire beehive is provided to add additional shelter to the beehive from the effects of the weather. When the beehive is in operation, and not being inspected, the master frames and doors will be configured in a rectangular shape in cross section with no space between adjacent master frames and doors, but without the inner comb frames of adjacent master frames rubbing against each other, since a "bee space" will be maintained for bee movement within the hive.

In a preferred embodiment, two pivotable connectors are attached to the master frame at a predetermined spacing which is the same for each master frame. The distance between the pivotable connectors connecting the master frame to the spline pole is, therefore, the same for each master frame, although the point of attachment of these connectors on each of the master frames relative to the height of the master frame will vary. The straight portions of the pivotable connectors are attached to an edge of each master frame. Also, preferably, the length of the straight portion of the pivotable connectors will vary in length to allow the master frames aligned on the spline pole to be configured adjacent to each other when the beehive is in a closed position. The configuration of master frames, doors, and pivotable connectors described above allows the cross section of the beehive to be rectangular, as previously mentioned, when the beehive is closed.

DESCRIPTION OF THE PREFERRED EMBODIMENT

Figure 1:
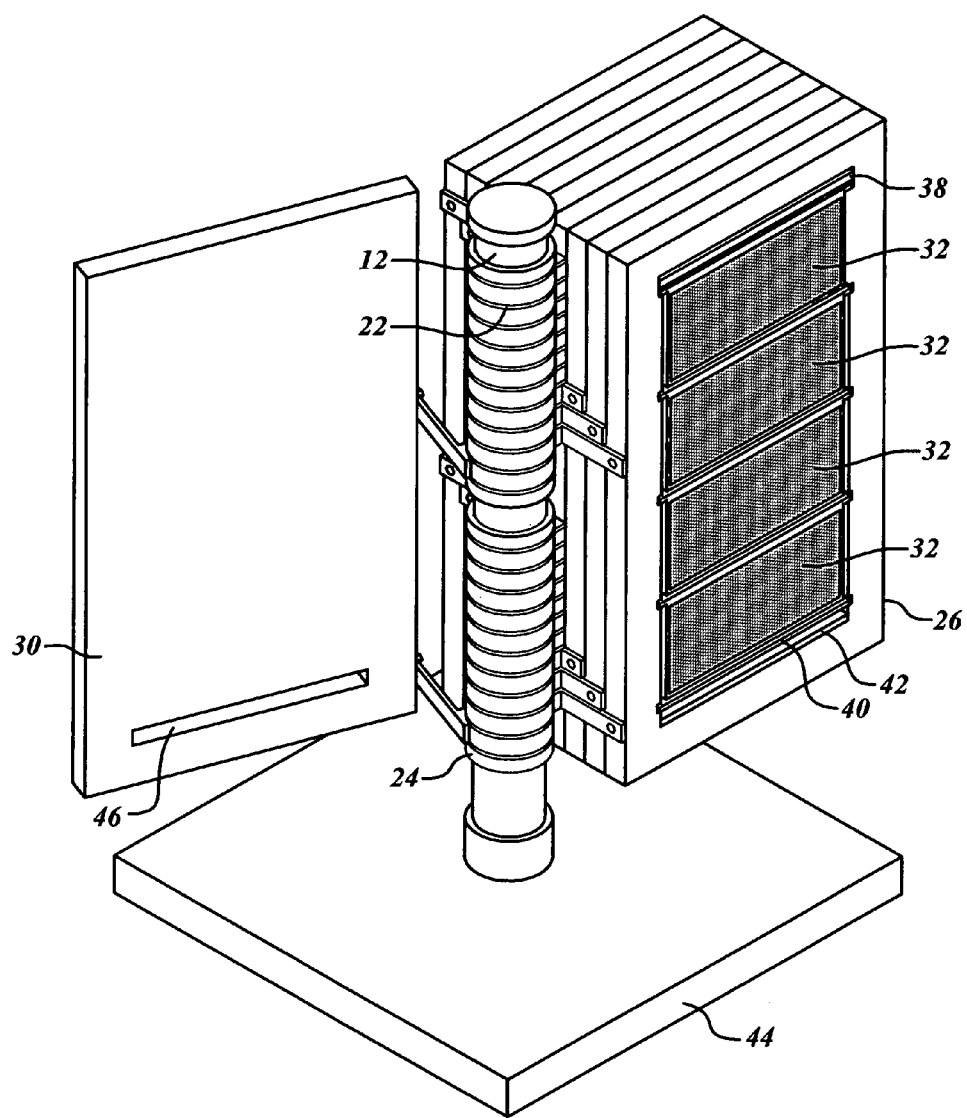
FIG. 1 is a pictorial view of the beehive of the present invention with the front door open.
Figure 2:
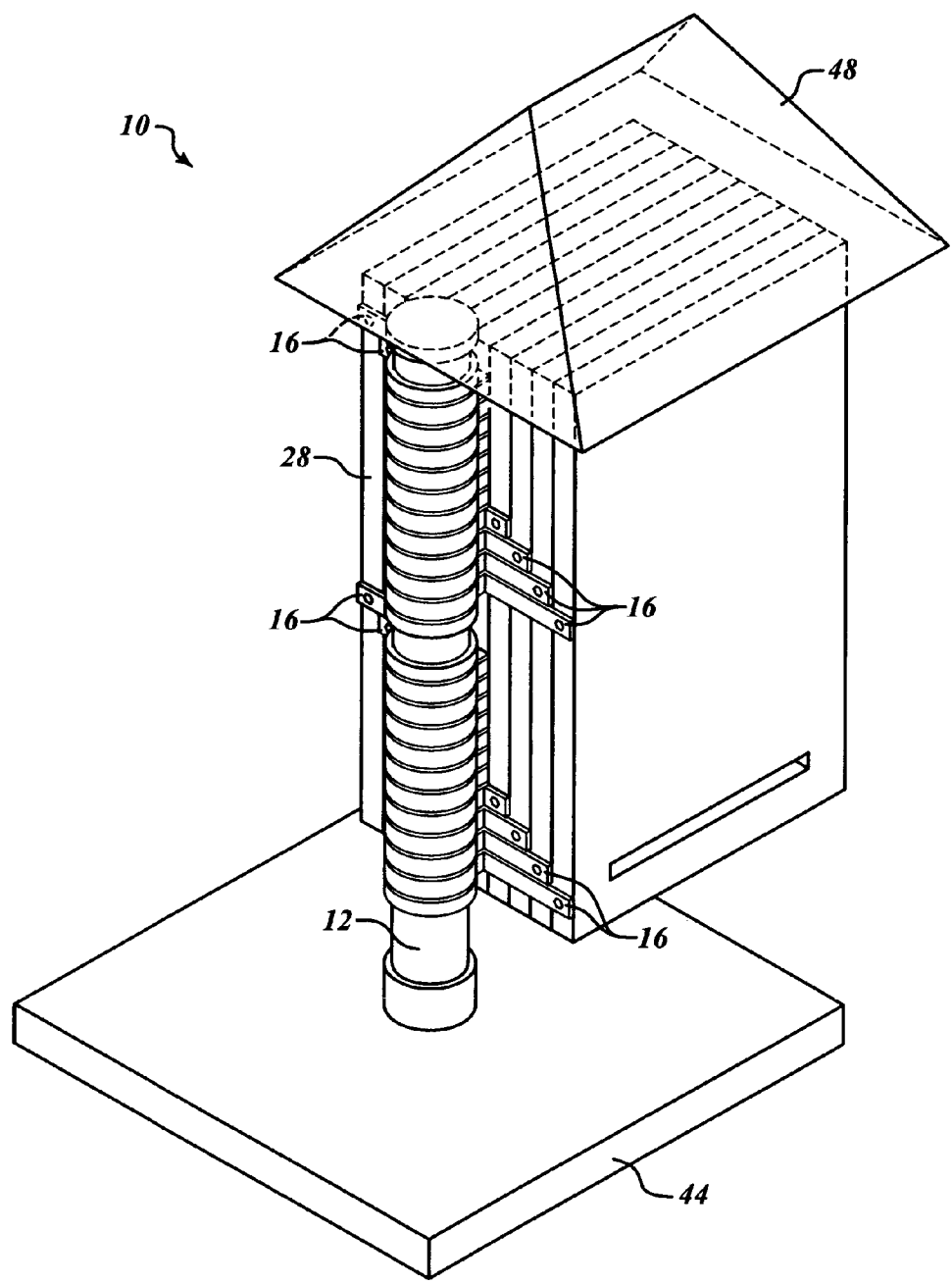
FIG. 2 is pictorial view of the beehive of the present invention showing the doors and frame closed.
Figure 3A:
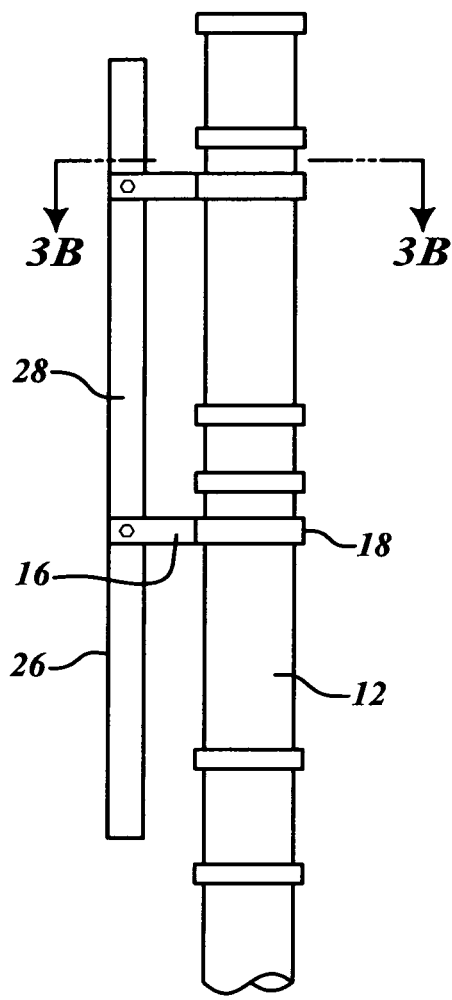
FIG. 3A shows a detailed elevation view of a master frame and pole with a section line 3B-3B.
Figure 3B:
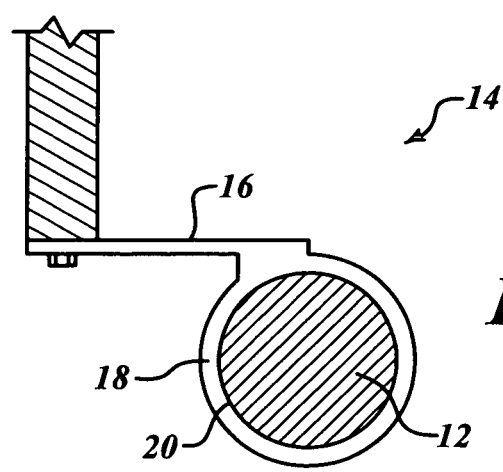
FIG. 3B is a view through sectional line 3B-3B of FIG. 3A.
Figure 4A:
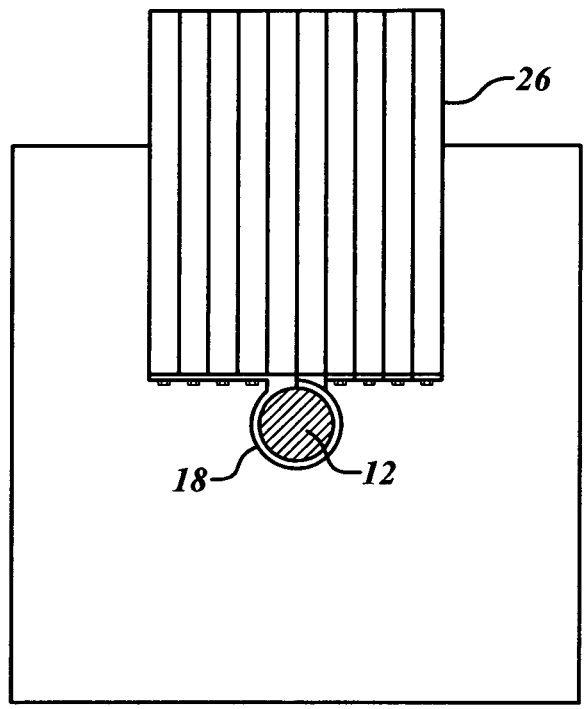
FIG. 4A is a top view of the master frame of the present invention showing the frames in a closed position.
Figure 4B:
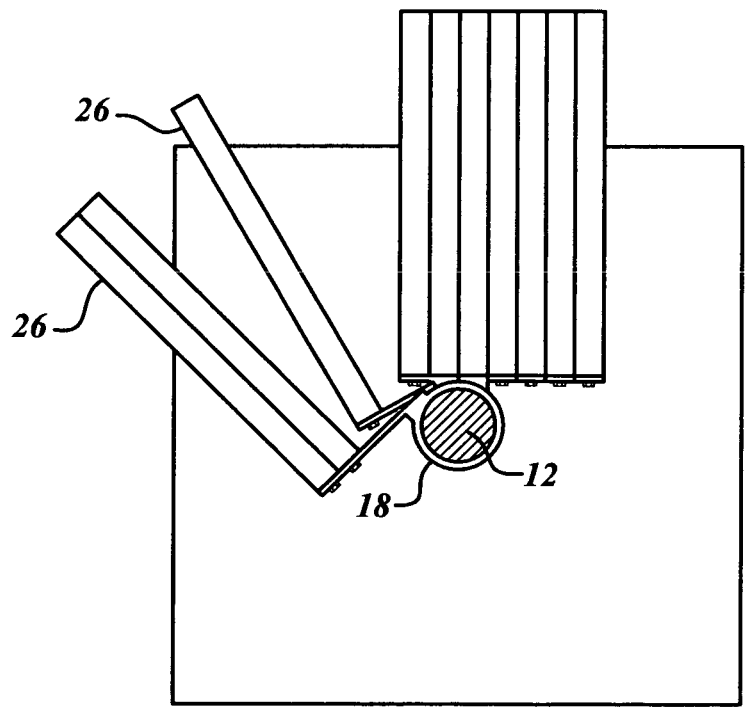
FIG. 4B is a top view of the master frame of the present invention showing the frames partially open.
Figure 5:
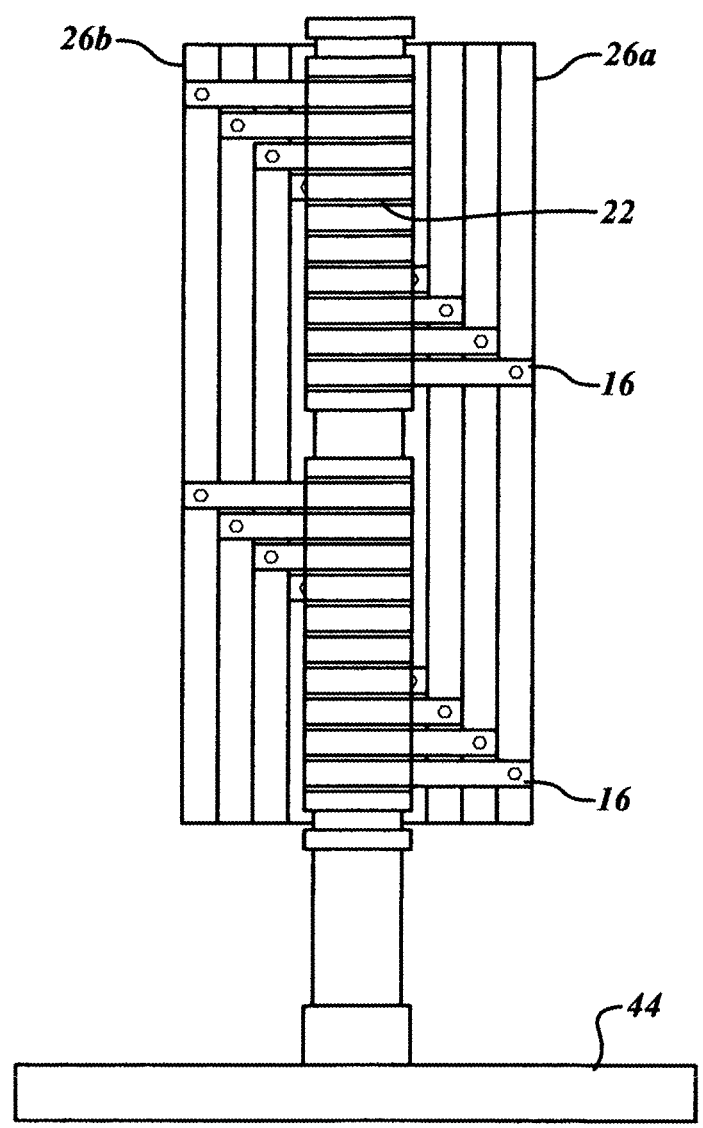
FIG. 5 is a side view of the master frame and pole of the present invention.
Figure 6:
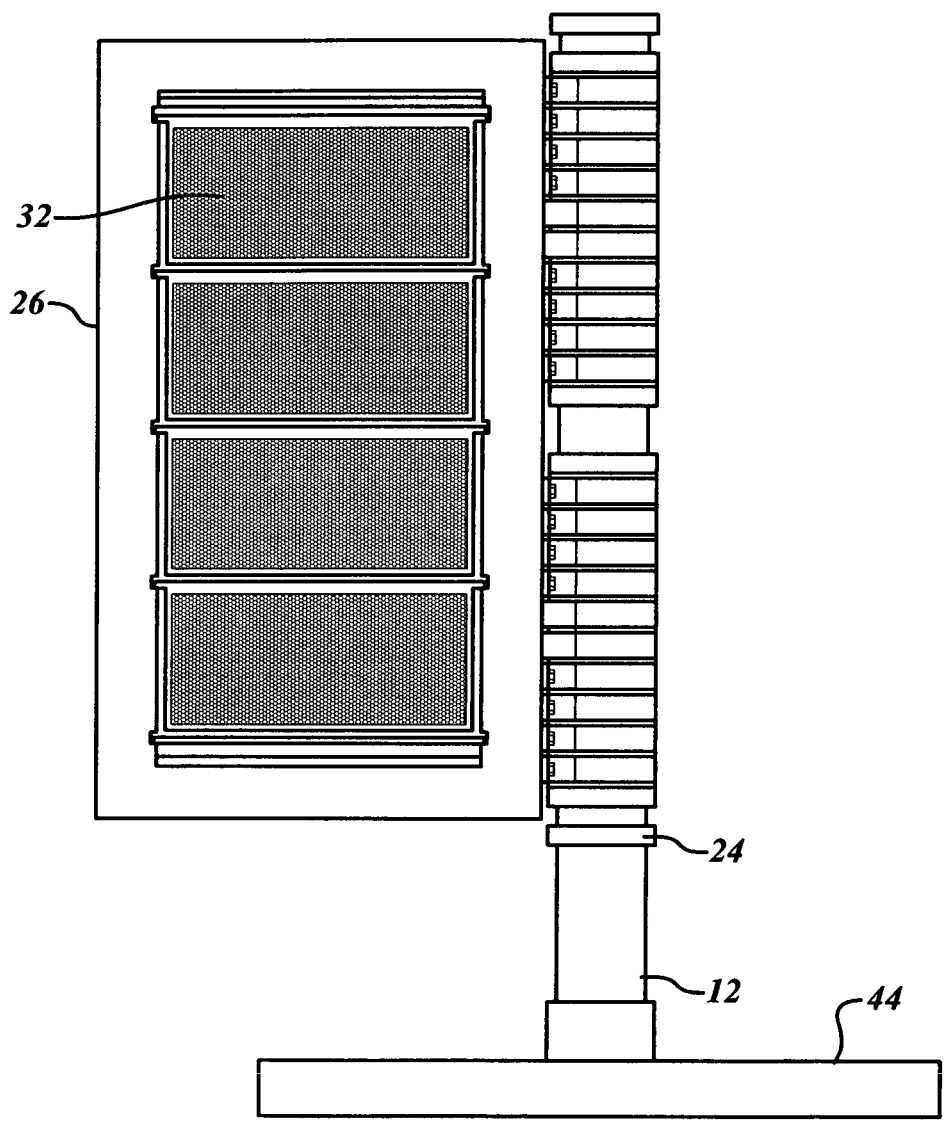
FIG. 6 is a front view of a one master frame and pole of the present invention.

Referring to the Figures, a beehive in accordance with the present disclosure can be described. A beehive, generally designated as 10, is shown. Beehive 10 is supported by a spline pole 12. The pole 12 can be made from a strong material such as aluminum and still be can be made from a strong material such as aluminum and still be relatively light in weight. Typically, the pole 12 will be approximately 3 inches in diameter for an average sized beehive. Pole 12 supports the pivotable connectors, designated as 14, which are also made of a durable, strong material such as aluminum. Pivotable connectors 14 have a straight portion 16 and a circular portion 18 which are connected integrally. The circular portion 18 of the pivotable connector 14 has an aperture 20 which receives pole 12 as best seen in FIG. 3B. The circular portions 18 of the pivotable connectors 14 are sized slightly larger in diameter than the outside diameter of pole 12, and can rotate around the pole 12. The circular portion 18 of pivotable connectors 14 are stacked on the pole 12 with a spacing washer 22 separating the individual circular portions 18 from each other. The entire stack of circular portions 18 of the pivotable connectors 14 rests on a collar 24 at the bottom of the stack. Additional collars 24 may be placed between various circular portions of the pivotable connectors 14 to distribute the weight load of the stack. Each straight portion 16 of the pivotable connectors 14 is connected to a master frame 26. The connection point between the straight portion 16 of the pivotable connector 14 and the master frame 26 occurs at the edge 28 of the individual master frame 26. The number of the pivotable connectors 14 and master frames 26 can vary. In a typical beehive, eight to ten master frames 26 are used, along with a front door 30 and a back door (not shown). It should be noted that typically, each master frame 26 will have two pivotable connectors 14 connected to its edge 28, and the two pivotable connectors 14 would be spaced the same vertical distance for each master frame 26. To allow movement of each master frame 26 without effecting the adjacent master frame, the pair of straight portions 16 of pivotable connectors 14 used for the master frame 26 varies in length (See FIG. 5). In this configuration, two of each of the master frames 26 have the same length of the straight portion 16 of the pivotable connectors 14 connected to their edges. In this way, the array of master frames 26 will be paired such that two master frames 26 will have the same length of straight portion 16 of pivotable connector 14 throughout the array with the length of the straight portions 16 of the pivotable connectors 14 varying for each pair. Further, the two straight portions 16 of the pivotable connectors 14 are connected to the edges 28 of each master frame 26 at a given or predetermined distance from the top of the master frame 26, and at a given distance from the bottom of the master frame 26. The two given distances from the top and bottom of the master frames 26 varies for each master frame 26 as shown in FIGS. 2 and 5. This configuration allows the beehive 10 to have a rectangular cross section when at rest, and no movement or strafing of adjacent master frames 26 as one or more master frames 26 are rotated for inspection as best seen in FIGS. 5A and 5B. The front door 30 and the back door would also be connected to the pole 12 in a manner similar to that described above for the master frames 26, and any movement of the front door 30 or back door would not disturb the adjacent master frame 26. In fact, referring to FIG. 5, the outside two master frames, designated as 26a and 26b in that Figure, could represent a front door and a back door, respectively. In other words, both the front and back door are mounted in a manner consistent with the mounting of the array of master frames 26.

Figure 7:
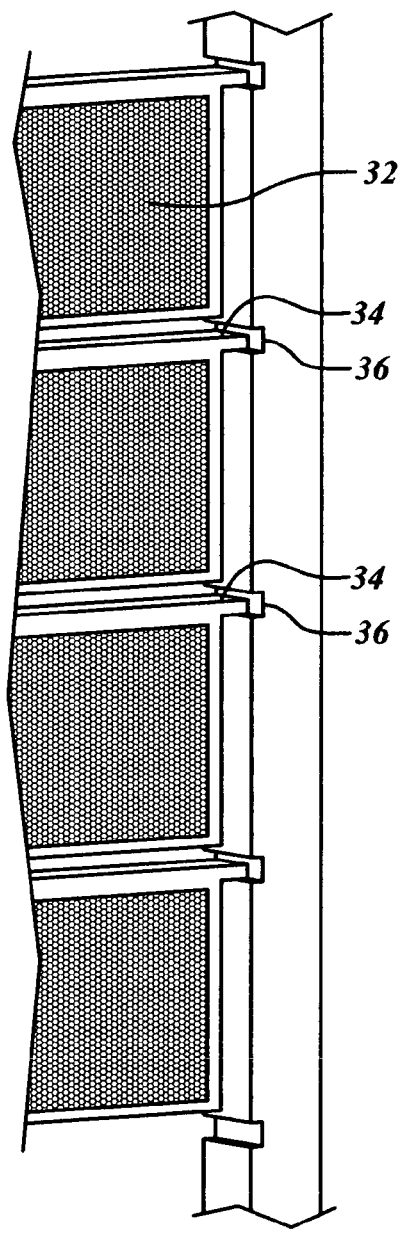
FIG. 7 is a cutaway pictorial view of comb frames suspended in a master frame of the present invention.

Each of the master frames 26 carry a number of inner comb frames, designated as 32. The number of comb frames 32 in a given master frame 26 can vary depending on the respective sizes of the comb frame 32 and master frame 26. A typical number would be four comb frames 32 for each master frame 26 as shown in the drawings. The inner comb frames 32 have a tab portion 34 at each top end of the comb frame 32 which fits in an indentation or slot 36 on each side of the master frame 26 as best shown in FIG. 7. In addition to the inner comb frame 32, the master frames 26 are provided with a top cover 38, and, optionally, a screened bottom board 40 and below the screened bottom board 40, an observation board 42. The top cover 38 prevents the bees from building "wild comb" in the void above the existing top inner comb frame. The screened bottom board 40 which is optionally provided gives the bees a bottom runway and quick access to all the comb frames 32. The screened board 40 allows debris (such as harmful mites) from the comb frames 32 to fall through its screen to an observation board 42 below. The beekeeper can monitor the observation board for possible harmful activity with the beehive.

In operation of the beehive 10, the process is started with an inner comb frame 32 hung at the bottom of each master frame 26. The bees will begin to build out wax comb on both sides of the comb frames 32. As the bees build out comb on the comb frames 32, an additional layer of comb frames 32 can be positioned above the lowest comb frames 32. Additional layers of comb frames 32 are positioned above the existing comb frames 32 as the bees continue to build, until the top level of comb frames 32 is reached. As mentioned previously, a top cover 38 would be fit over the top set of comb frames 32 to prevent further comb building in the space above the comb frames 32.

A base 44 can be used to hold pole 12, or alternatively, the pole 12 can be fixed directly into the ground. Front door 30 has a slotted entry 46 which serves as the main entry and exit of the bees to the hive. The back door functions as a barrier to prevent exit or entry of the bees to the hive in a way other than through the slotted entry 46 of the front door 30. When in the hive, the bees have access to all of the inner comb frames 32 suspended therein. Further provided is a roof 48 which shelters the beehive.

When inspection of the comb frames 32 is required, the master frames 26 can be opened due to the common pivot point of each master frame 26 around pole 12. The front door 30, master frames 26, and the back door can be opened individually or in groups. In any case, movement or sliding of one master frame against another is avoided. Inspection can be made of both sides of the comb frame 32 contained within the master frame 26 without destroying or disrupting the comb built by the bees and without removing the comb frame 32 from the master frame 26.

Figure 8:
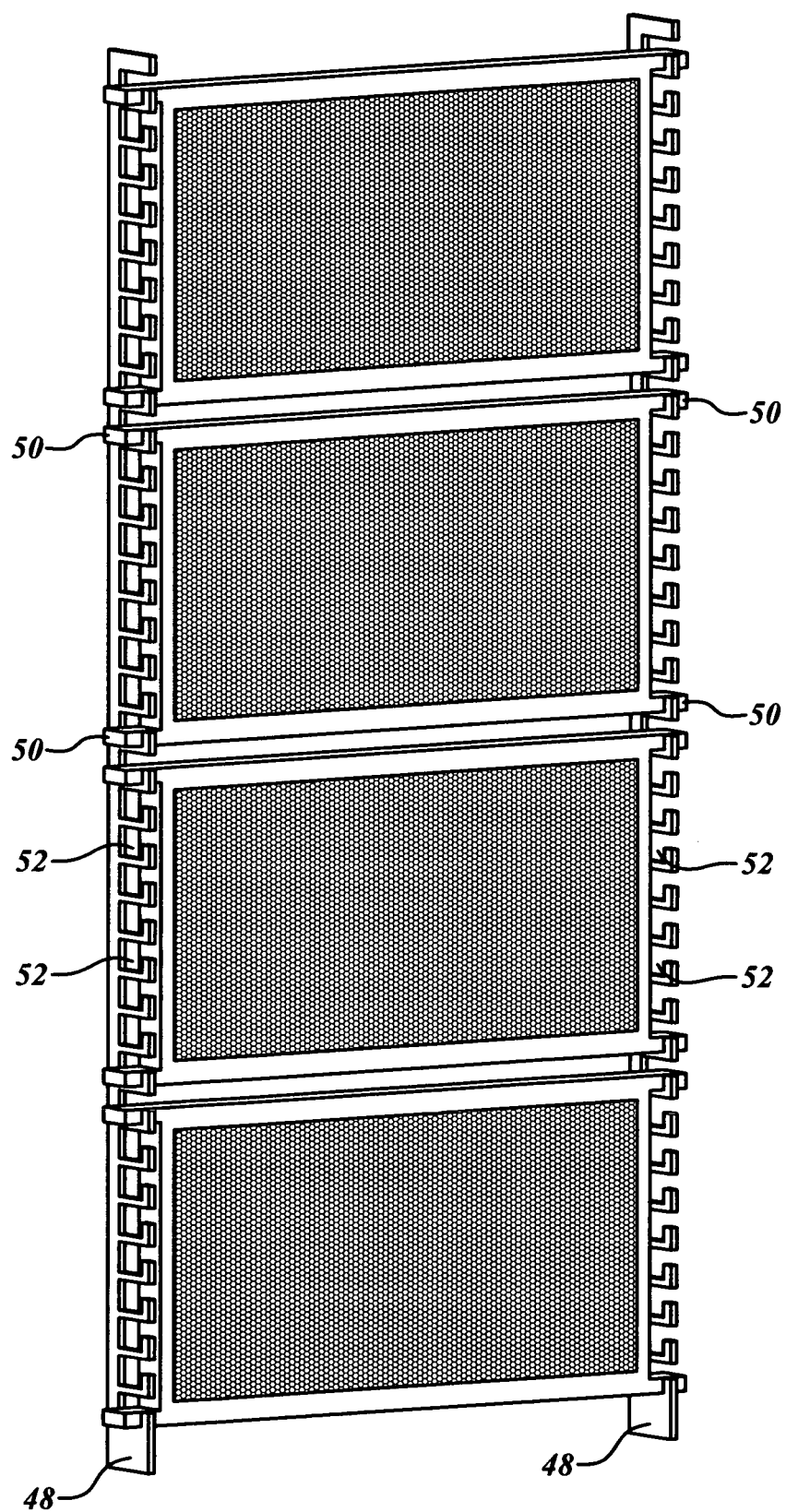
FIG. 8 is a pictorial view of a rack fitted within the master frame and holding inner comb frames.

FIG. 8 shows an alternative embodiment for suspending the comb frames 32 within the master frames 26. In this embodiment, a rack 48 is provided, preferably made of aluminum which is fastened within the master frame 26. The inner comb frames 32 have a set of tabs 50 at the top and bottom corners of each comb frame 32. The tabs 50 are fit within appropriate slots 52 in the rack 48, resulting in the comb frames being supported at each corner within master frames 26.

What is claimed is:

1. A beehive for cultivating honeybees having a pole aligned vertically, and a plurality of master frames, each of said plurality of master frames being pivotably attached to said pole by two pivotable connectors, said two pivotable connectors of each of said master frames having a straight portion of a predetermined length, said predetermined length of said straight portions of said two pivotable connectors of each of said master frames varying for each of said master frames, allowing each of said master frames to be configured on said pole adjacent to each other, each of said master frames having an edge portion, said straight portions of said two pivotable connectors of each of said master frames being attached to said edge portion of each of said master frames at two connection points, said two connection points being separated by a predetermined distance on each of said master frames, said predetermined distance between said two connection points of said straight portions of said two pivotable connectors to each of said master frames being the same for each of said master frames, said two pivotable connectors of each of said master frames each having a circular portion, said circular portion of each of said pivotable connectors having an aperture adapted to receive said pole, thereby allowing rotation of each of said master frames around said pole.

2. The beehive of claim 1 having said master frames arranged in pairs, such that said predetermined length of each of said straight portions of said two pivotable connectors of each of said master frames is the same for each pair of said master frames, and said predetermined length of said straight portion of said two pivotable connectors of each of said pairs of said master frames varies in length for each of said pairs of said master frames.

3. The beehive of claim 2 wherein said plurality of master frames aligned on said pole is rectangular in cross section when said plurality of master frames are in a closed position.

4. The beehive of claim 3 which includes a plurality of inner comb frames held within each of said master frames, for allowing honeybees to build a wax comb on both sides of each of said inner comb frames.

5. The beehive of claim 4 which includes a top cover fixed above said inner comb frames to prevent the honeybees from building a honeycomb above said inner comb frames.

6. The beehive of claim 4 wherein each of said master frames has inside edges with indentations whereby said inner comb frames rest on said indentations in said inside edges of each of master frames.

7. The beehive of claim 4 which includes an observation board below said inner comb frames, said observation board slidably engaged in each of said master frames, thereby allowing inspection of any debris fallen from said inner comb frames.

8. The beehive of claim 7 which includes a screened bottom board placed above said observation board, thereby allowing the honeybees access to said inner comb frames, and allowing debris from said inner comb frames to fall to said observation board.

9. The beehive of claim 4 which includes a door in front of said plurality of said master frames, said door having a slotted entrance for the honeybees, allowing the honeybees entry to or exit from the beehive.

10. The beehive of claim 4 in which said inner comb frames are each rectangular and have four corners, said inner comb frames being supported at each of said four corners within each of said master frames.

11. The beehive of claim 1 having master frames each with a top and a bottom, said straight portions of said two pivotable connectors of each of said master frames being attached to said edge portion of each of said master frames at said two connection points, wherein each of said two connection points of said straight portion of each pivotable connector to said edge portion of each of said master frames are at a distance from said top and said bottom of each of said master frames, and said distance from said top and said bottom of each of said master frames is different for each of said master frames.

* * * * *